United States Patent [19]

Oetting et al.

[11] Patent Number: 4,543,855
[45] Date of Patent: Oct. 1, 1985

[54] METHOD FOR OPERATING A VEHICLE HAVING AN AUTOMATIC, CONTINUOUSLY VARIABLE GEAR RATIO TRANSMISSION

[75] Inventors: Hermann Oetting, Brunswick; Paulus Heidemeyer, Wolfsburg; Frank Zimmermann, Brunswick, all of Fed. Rep. of Germany

[73] Assignee: Volkswagenwerk Aktiengesellschaft, Wolfsburg, Fed. Rep. of Germany

[21] Appl. No.: 480,840

[22] Filed: Mar. 31, 1983

[30] Foreign Application Priority Data

Apr. 1, 1982 [DE] Fed. Rep. of Germany ....... 3212091

[51] Int. Cl.$^4$ .............................................. B60K 41/14
[52] U.S. Cl. ..................................... 74/859; 74/857; 74/865; 74/872; 74/877
[58] Field of Search ................. 74/856, 857, 859, 861, 74/865, 866, 872, 877; 192/0.073, 3.58; 364/424.1, 431.01, 431.03, 431.07

[56] References Cited

U.S. PATENT DOCUMENTS

| | | | |
|---|---|---|---|
| 3,662,624 | 5/1972 | Leonard | 74/865 |
| 3,890,360 | 6/1975 | Pruvot et al. | 74/857 X |
| 4,023,442 | 5/1977 | Woods et al. | 74/861 X |
| 4,091,690 | 5/1978 | Miyao | 74/865 |
| 4,107,776 | 8/1978 | Beale | 74/866 X |
| 4,291,594 | 9/1981 | Baudoin | 74/857 |
| 4,294,341 | 10/1981 | Swart | 192/0.073 |
| 4,438,664 | 3/1984 | Fiala | 74/877 X |
| 4,445,329 | 5/1984 | Drisko | 74/865 X |

FOREIGN PATENT DOCUMENTS

| | | |
|---|---|---|
| 761444 | 8/1952 | Fed. Rep. of Germany . |
| 2811574 | 9/1979 | Fed. Rep. of Germany . |
| 2934270 | 3/1981 | Fed. Rep. of Germany ........ 74/859 |

Primary Examiner—Leslie A. Braun
Assistant Examiner—Dwight G. Diehl
Attorney, Agent, or Firm—Brumbaugh, Graves, Donohue & Raymond

[57] ABSTRACT

A method for operating a vehicle having an automatic, continuously variable speed transmission comprising at least three control phases. During a first control phase, the engine speed is maintained at a substantially constant value while the transmission gear ratio is increased to the maximum transmission gear ratio. During a second control phase, the transmission gear ratio is maintained at the maximum transmission gear ratio while the engine speed is increased to the maximum engine speed possible at the maximum gear ratio and selected throttle valve angle. During a third control phase, the transmission gear ratio is decreased from the maximum transmission gear ratio, so that higher vehicle traveling speeds may be obtained. During the third control phase the transmission gear ratio may be rapidly changed to a ratio corresponding to maximum engine power when the accelerator pedal is placed in a kickdown position. Increased force on the accelerator pedal may be required to place the accelerator pedal in the kickdown position.

8 Claims, 5 Drawing Figures

METHOD FOR OPERATING A VEHICLE HAVING AN AUTOMATIC, CONTINUOUSLY VARIABLE GEAR RATIO TRANSMISSION

BACKGROUND OF THE INVENTION

The invention concerns a method for operating a vehicle having an automatic, continuously variable gear ratio transmission, in particular, a passenger automobile. More specifically, the invention concerns a method for operating a vehicle wherein the transmission gear ratio, and possibly the throttle valve angle, is controlled as a function of the depression of the accelerator pedal, and possibly also as a function of the engine speed.

In commonly known automatic, continuously variable gear ratio transmissions, a control unit, which could be formed by a cam plate, for example, is used for adjusting a correcting element, which determines the transmission gear ratio. The control unit is typically fixedly connected with an accelerator pedal, or a throttle valve in carburetor engines. Accordingly, each accelerator pedal or throttle valve position is associated with a defined engine speed and a defined transmission gear ratio. In other words, the vehicle is controlled as a function of the depression of the accelerator pedal.

In using such transmissions to obtain the most favorable possible fuel economy, the transmission gear ratio is rapidly increased to its maximum value as the vehicle accelerates, and thereafter maintained at this value, even at small accelerator pedal angles. Frequently, in a vehicle having a transmission controlled in this manner, the maximum traveling speed of the vehicle cannot be attained at the maximum transmission gear ratio, which corresponds to a speed-increasing or overdrive gear ratio. However, in order to solve this problem, there have been provided systems wherein the gear ratio becomes smaller as the accelerator pedal is depressed beyond a specified accelerator pedal position, or throttle valve angle, in the vicinity of the full acceleration position of the accelerator pedal. The full acceleration position of the accelerator pedal is the position in which the throttle valve is fully opened. These smaller gear ratios result in larger engine speeds. When the accelerator pedal is fully depressed, a transmission gear ratio is set so that the maximum engine speed, the maximum traveling speed of the vehicle, and maximum engine power are attained.

However, with a transmission controlled in this manner, at complete or nearly complete depression of the accelerator pedal from a travel condition at a low load, the maximum transmission gear ratio, which is the most favorable for fuel consumption, can never be set; rather, only a lower gear ratio, which corresponds to an accelerator pedal position associated with a greater vehicle traveling speed and a less favorable fuel consumption condition, is set.

BRIEF SUMMARY OF THE INVENTION

The invention concerns a method for operating a vehicle having an engine, an accelerator pedal, a throttle valve, and an automatic, infinitely variable transmission. In accordance with the invention the vehicle is controlled during various control phases. In one embodiment of the invention, during a first control phase, the engine speed is maintained at a substantially constant value while the transmission gear ratio is increased to the maximum transmission gear ratio. During a second control phase, the transmission gear ratio is maintained at the maximum transmission gear ratio while the engine speed is increased to the maximum engine speed possible at the maximum transmission gear ratio and selected throttle valve angle. During a third control phase, the transmission gear ratio is decreased from the maximum transmission gear ratio, so that higher vehicle traveling speeds may be obtained.

In a particular embodiment of the invention, during the third control phase the transmission gear ratio is rapidly decreased to a ratio corresponding to maximum engine power while the acceleration of the vehicle is maintained at a substantially constant value. Alternatively, during the third control phase the transmission gear ratio is controlled as a function of the depression of the accelerator pedal.

In an embodiment of the invention, during the third control phase the transmission gear ratio is rapidly changed to a value corresponding to maximum engine power when the accelerator pedal is placed in a kickdown position, i.e., a position that corresponds to a fully actuated accelerator pedal. Additional pedal force may be required to place the accelerator pedal in the kickdown position.

In another embodiment of the invention, the transmission gear ratio may initially be decreased from the maximum transmission gear ratio during the third control phase while the throttle valve is simultaneously closed by a predetermined angle; the transmission gear ratio is decreased further and the throttle valve is opened more in response to additional depression of the accelerator pedal, and the transmission gear ratio is decreased to a ratio corresponding to maximum engine power when the throttle valve is fully opened.

In still another embodiment of the invention, the three phases of control correspond to three ranges of accelerator pedal positions. During a first control phase, the throttle valve is linearly opened to a predetermined angle in response to the depression of the accelerator pedal within a first range while the transmission gear ratio is maintained at the maximum transmission gear ratio. During a second control phase, corresponding to a second range of pedal positions, the transmission gear ratio is linearly decreased as a function of pedal position to a ratio corresponding to maximum engine power in response to additional depression of the accelerator pedal while the throttle valve is maintained at the predetermined angle. During a third control phase, in the range of maximum pedal activation, the throttle valve is linearly opened to a fully opened position in response to additional depression of the accelerator pedal, while the transmission gear ratio is maintained at the ratio corresponding to maximum engine power.

A control method in accordance with the invention operates a vehicle at more favorable fuel consumption conditions and provides a vehicle with better road behavior. Since a control method in accordance with the invention adjusts the transmission gear ratio to its maximum value over a substantial portion of the entire accelerator pedal depression and reduces the transmission gear ratio only after the maximum engine speed possible at the maximum transmission gear ratio is reached, a vehicle operated thusly has favorable fuel consumption characteristics over a wide range of operating conditions; additionally, such a vehicle is able to achieve vehicle traveling speeds above the vehicle speed associated with the maximum engine speed possible at the maximum transmission gear ratio.

For a better understanding of the invention, reference is made to the following detailed description of the preferred embodiments taken in conjunction with the drawings accompanying the application.

DETAILED DESCRIPTION OF THE PREFERRED EMBODIMENTS

Figure 1:
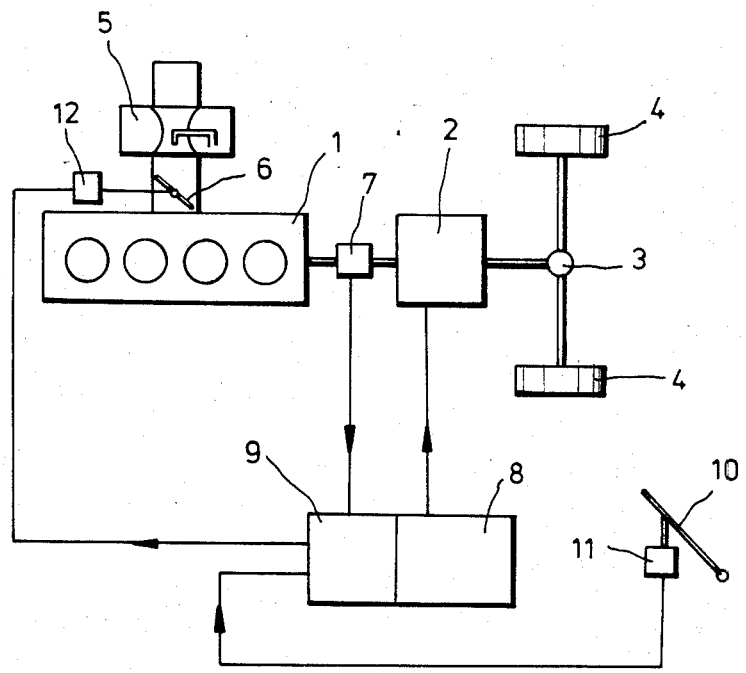
FIG. 1 is a schematic diagram of a vehicle that may be controlled in accordance with the invention.

In FIG. 1, a passenger automobile, which has, in the customary manner, an internal combustion engine 1 and an automatic, continuously variable gear ratio transmission 2, is shown schematically. The transmission 2 is connected on the input side with the driving engine 1 and on the output side with the driven wheels 4 of the vehicle by an axle drive 3. The reference numeral 5 designates a fuel delivery device, e.g., a carburetor, for the internal combustion engine 1. The reference numeral 6 designates a throttle valve arranged in the intake pipe of the internal combustion engine, which is the usual arrangement in gasoline engines.

The reference numeral 8 designates a correcting element for adjusting the transmission gear ratio of the automatic, continuously variable gear ratio transmission 2. Associated with the correcting element 8 is a control unit 9 that acts on the correcting element. The control unit 9 receives an engine speed signal from a rotational speed sensor 7 and an accelerator pedal position signal from a position sensor 11 that is associated with the accelerator pedal 10. From these signals, the control unit 9 determines a gear ratio for the infinitely variable transmission 2 that is adjusted to the operating condition of the vehicle in accordance with a program previously introduced into the control unit. Additionally, the control unit 9 may determine the position of the throttle valve 6. A control motor 12 actuates the throttle valve 6.

Figure 2:
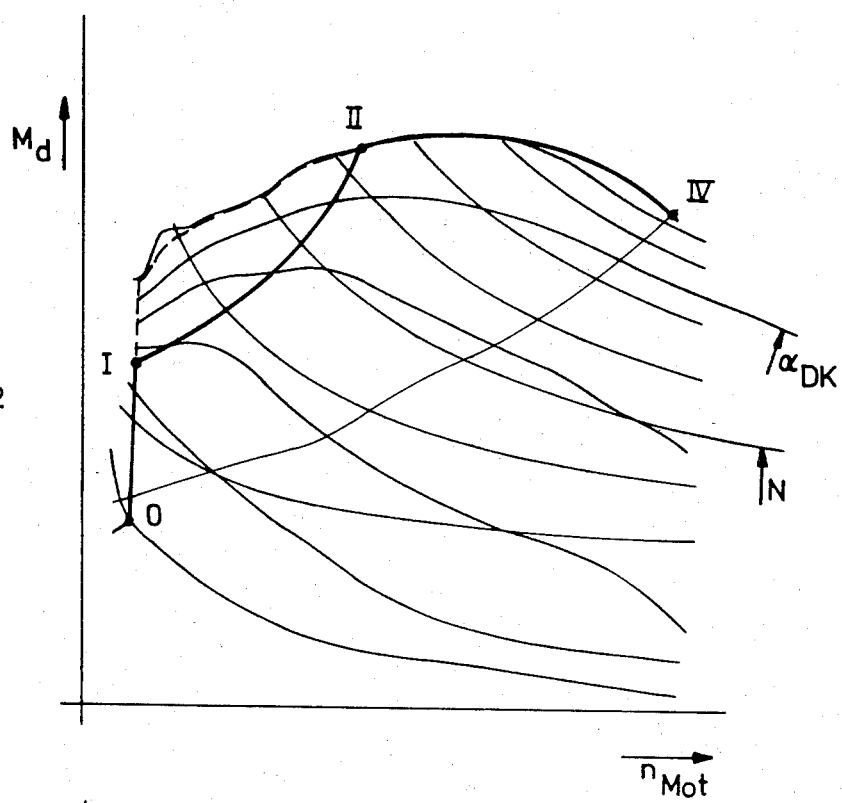
FIGS. 2 through 4 are engine output diagrams in which engine torque is plotted as a function of engine speed, and lines of constant throttle valve angle and engine power are also plotted.
Figure 3:
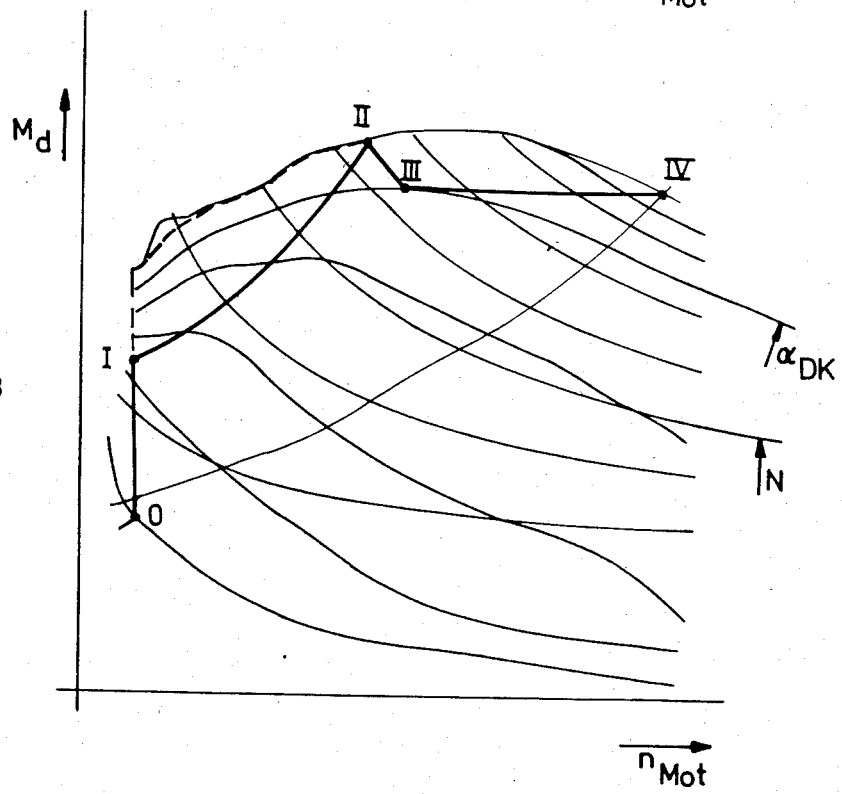
Figure 4:
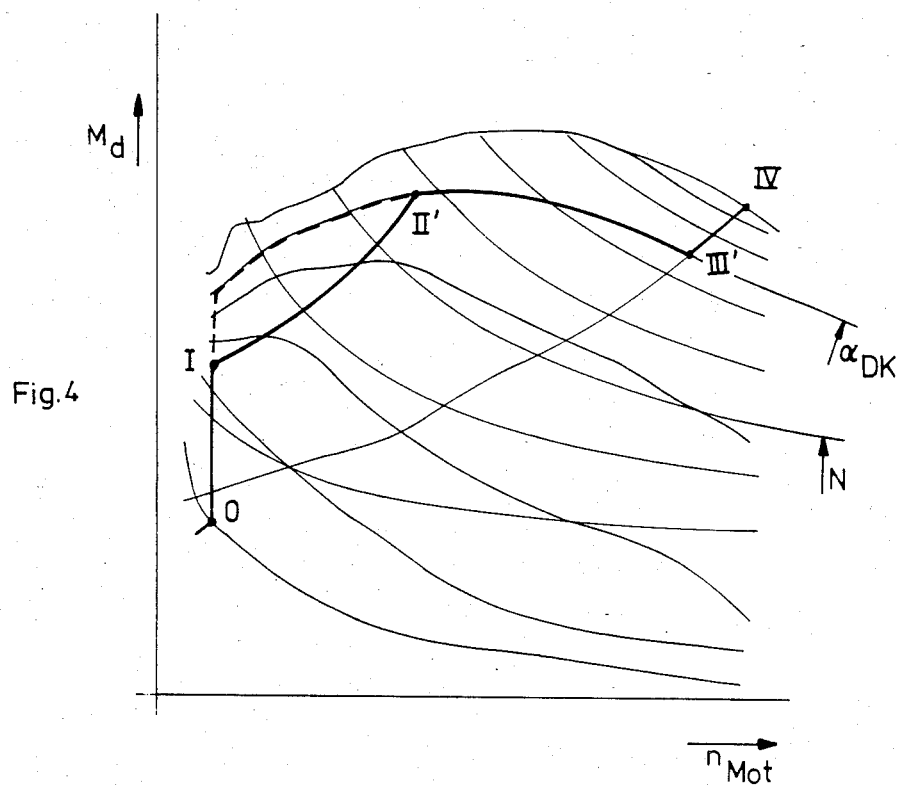

In accordance with the invention, a vehicle is operated so that the maximum transmission gear ratio, $ü_{max}$, is set over substantially the entire accelerator pedal depression or throttle valve path. FIGS. 2, 3, and 4 illustrate various ways in which a vehicle is controlled in accordance with the invention. In FIGS. 2, 3, and 4, the engine torque, $M_d$, is plotted on the y-axis, and the engine speed, $n_{Mot}$, is plotted on the x-axis. Additionally, lines of constant throttle valve angle, $\alpha_{DK}$, and lines of constant engine power, N, are plotted. The lines of constant engine power correspond in first aproximation to lines of constant vehicle speed when the vehicle is traveling on a level surface.

FIG. 2 illustrates how the control unit 9 may regulate the transmission gear ratio in accordance with one embodiment of the invention. Starting from the rest condition 0, where the vehicle is being put into motion, the transmission gear ratio is increased to its maximum value at point I with approximately constant actuation of the accelerator pedal. The engine speed is maintained at a substantially constant value during the control phase from point 0 to point I. During the next control phase, i.e., from point I to point II, the transmission gear ratio is maintained at its highest value, and the vehicle traveling speed is increased by increasing the engine speed $n_{Mot}$. At point II, which is the point where the transmission gear ratio is the maximum transmission gear ratio and the throttle valve is fully opened, the maximum engine speed possible at the highest transmission gear ratio is reached. However, this engine speed, and the associated vehicle traveling speed, does not correspond to the maximum vehicle traveling speed based on the maximum engine power. The maximum vehicle traveling speed may frequently be obtained only at a gear ratio smaller than the maximum transmission gear ratio since the maximum transmission gear ratio constitutes a speed-increasing or overdrive ratio at which maximum engine power cannot be obtained because the engine speed is reduced.

In order to reach the maximum vehicle traveling speed corresponding to maximum engine power, the vehicle is controlled during the next control phase, i.e., from point II to point IV, so that after reaching point II, namely, after reaching the maximum engine speed possible at the maximum transmission gear ratio, the transmission gear ratio is automatically adjusted to lower values. In one embodiment of the invention, the transmission gear ratio is adjusted so that when the maximum engine speed possible at the maximum transmission gear ratio is reached, i.e., point II is reached, the transmission gear ratio is reduced so that the vehicle acceleration is maintained at a substantially constant value during the gear ratio reduction. The vehicle is controlled in this manner until a transmission gear ratio corresponding to maximum engine power, and therefore the maximum vehicle traveling speed, is reached. This adjustment is performed so that the acceleration of the vehicle remains constant until the maximum vehicle traveling speed (maximum engine power) is reached, i.e., until point IV is reached. When the transmission gear ratio is regulated in this manner, a steady-state vehicle operating condition between points II and IV cannot be maintained since the control unit automatically and continuously reduces the transmission gear ratio from its maximum value to a value corresponding to maximum engine power.

If a free travel path is associated with the accelerator pedal, the vehicle may be operated so that a steady-state operating condition between points II and IV can be maintained. The free travel path follows the full acceleration position of the accelerator pedal, a position which corresponds to a fully opened throttle valve. In the free travel path of the accelerator pedal, a path in which the throttle valve remains fully opened, the vehicle may be controlled so that the transmission gear ratio becomes continuously smaller as the accelerator pedal is depressed further, until a final stop is reached. The transmission gear ratio at the final stop is the ratio corresponding to maximum engine power, and necessarily the maximum vehicle traveling speed. In this embodiment, the vehicle is controlled so that the maximum engine speed possible at the maximum transmission gear ratio is reached, point II, and then any desired steady-state operating condition on the curve between the points II and IV can be maintained through appropriate actuation of the accelerator pedal in the free travel path that follows the full acceleration position of the accelerator pedal. The final stop of the free travel path corresponds to a kickdown position of the accelerator pedal.

An accelerator pedal with a kickdown position could also be provided in the above-mentioned embodiment of the invention wherein the transmission gear ratio is automatically and continuously reduced between points II and IV while the acceleration of the vehicle is maintained at a substantially constant value. A kickdown position could be provided even if no free travel path is associated with the accelerator pedal. If a kickdown position is provided, the vehicle is controlled so that, during another control phase, specifically, when the accelerator pedal is placed in the kickdown position, the transmission gear ratio corresponding to maximum engine power is rapidly set starting from any vehicle operating condition.

An advantage of a vehicle operating method in accordance with the invention is that at the full acceleration position of the accelerator pedal, where the throttle valve is fully opened, but not at the kickdown position of the accelerator pedal, the maximum transmission gear ratio is set so that the vehicle is operated in a very favorable manner for fuel economy. The start of the kickdown position may be indicated by an actuation force threshold, i.e., by an abrupt increase in the force required to move the accelerator pedal, which serves to inform the operator of the operating state; the accelerator pedal is more easily displaced in the operating state corresponding to a fuel-saving mode of operation.

FIG. 3 illustrates how a vehicle may be operated in accordance with another embodiment of the invention. After the maximum engine speed possible at the maximum transmission gear ratio is reached, i.e., after point II is reached, the gear ratio is initially reduced by a fixed amount and the throttle valve is simultaneoulsy closed by a predetermined angle, so that the vehicle operating condition is shown by point III. Subsequently, the throttle valve can be actuated to the fully opened position and the transmission gear ratio can simultaneously be reduced to the value corresponding to maximum engine power as the accelerator pedal is depressed further. In this embodiment too, at the full acceleration position of the accelerator pedal, the transmission gear ratio is adjusted to its maximum value, and only after the maximum engine speed possible at the maximum transmission gear ratio is reached, i.e., only after point II is reached, is the transmission gear ratio decreased by a fixed amount and the throttle valve closed by a predetermined angle. The vehicle is operated so that the operator can select any steady-state vehicle operating condition on the line between points III and IV by appropriately actuating the accelerator pedal in the vicinity of the full acceleration position. Again, in this region each accelerator pedal position is associated with a defined throttle valve position and a defined transmission gear ratio.

Figure 5:
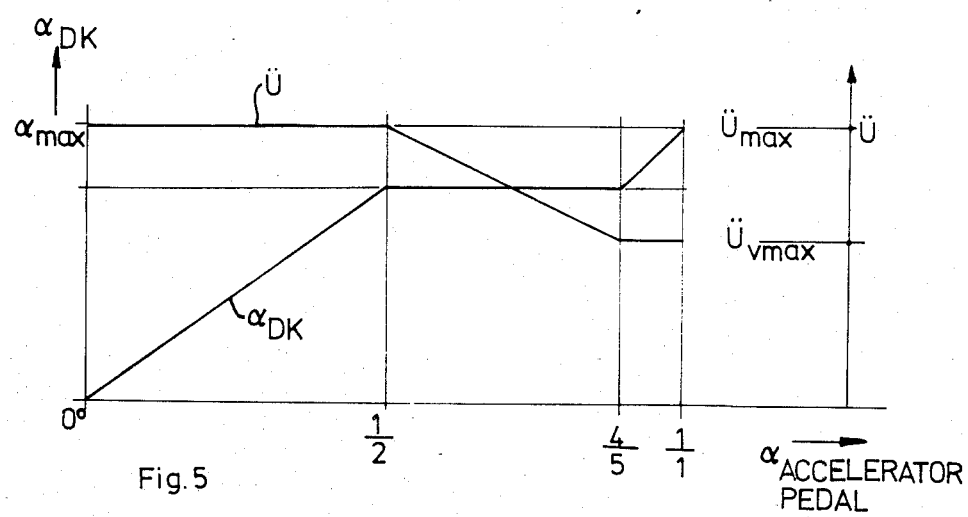
FIG. 5 is a graph of throttle valve angle and transmission gear ratio plotted as functions of accelerator pedal depression for a control method in accordance with one embodiment of the invention.

FIGS. 4 and 5 illustrate how a vehicle may be operated in accordance with still another embodiment of the invention. As seen from FIGS. 4 and 5, there are three control phases that correspond to three ranges of accelerator pedal positions. This embodiment differs from the embodiments described above in that the maximum transmission gear ratio is not set over substantially the entire accelerator pedal depression. As shown in FIG. 5, in which throttle valve angle, $\alpha_{DK}$, and transmission gear ratio, ü, are plotted as functions of accelerator pedal position or depression, $\alpha_{accelerator\ pedal}$, the transmission gear ratio ü is maintained at its maximum value, $ü_{max}$, and the throttle valve is linearly opened to a predetermined angle, e.g., approximately 90% of the fully opened position, in response to accelerator pedal depression in a first control phase, e.g., over approximately half of the total accelerator pedal depression. This operating point is shown as point II' in FIG. 4. This point may be defined by a pressure point provided on the accelerator pedal. If this point is exceeded, the vehicle is controlled so that the throttle valve is maintained at the predetermined angle, and the transmission gear ratio is linearly reduced to a value corresponding to maximum engine power and maximum vehicle traveling speed, $ü_{vmax}$, in response to additional accelerator pedal depression in a second control phase, e.g., over approximately the next 30% of the total accelerator pedal depression. In a third control phase, e.g., over approximately the next 20% of the total accelerator pedal depression, the vehicle is controlled so that the throttle valve is linearly opened to the fully opened position, $\alpha_{max}$, in response to additional accelerator pedal depression while the transmission gear ratio is maintained at the value corresponding to maximum engine power, $ü_{vmax}$. In this manner, any and all steady-state vehicle operating conditions on the series of curves I-II'-III'-IV in FIG. 4 can be adjusted and maintained. Moreover, the pressure point on the accelerator pedal offers the operator a clear indication of when he is setting a gear ratio which differs from the gear ratio most favorable for fuel economy. The final stop, at complete accelerator pedal actuation, may correspond to a kickdown position at which the gear ratio $ü_{vmax}$ will be adjusted immediately from any prior vehicle operation condition.

The above-described embodiments of the invention are merely illustrative. Variations of and modifications to the invention will be apparent to those skilled in the art without departing from the inventive concepts disclosed herein. All such variations and modifications are intended to be within the scope of the present invention as defined by the following claims.

We claim:

1. A method for operating a vehicle having an engine, an accelerator pedal, a throttle valve, and an automatic, continuously variable gear ratio transmission comprising the steps of:

during a first control phase, maintaining the engine speed at a substantially constant value while increasing the transmission gear ratio to the maximum transmission gear ration;

during a second control phase, maintaining the transmission gear ratio at the maximum transmission gear ratio while increasing the engine speed to the maximum engine speed possible at the maximum transmission gear ratio and selected throttle valve angle; and during a third control phase effective only after reaching said maximum possible engine speed at said maximum transmission gear ratio and selected throttle valve angle, decreasing the transmission gear ratio from the maximum transmission gear ratio, whereby higher vehicle traveling speeds are obtained.

2. A method according to claim 1, wherein said third control phase is operative in response to full activation of said acceleration pedal into a kickdown position and comprises decreasing rapidly the transmission gear ratio to a ratio corresponding to maximum engine power.

3. A method according to claim 2, further including providing increased force in opposition to movement of said accelerator pedal into said kickdown position as compared to the opposition force in other positions.

4. A method according to claim 1 wherein during said third control phase the transmission gear ratio is decreased to a ratio corresponding to maxinum engine power and wherein during said third control phase acceleration of the vehicle is maintained at a substantially constant value.

5. A method according to claim 1 wherein during said third control phase the transmission gear ratio is initially rapidly decreased from the maximum transmission gear ratio by a fixed amount and the throttle valve is simultaneously closed by a predetermined angle, the transmission gear ratio decreasing and the throttle valve opening in response to additional depression of said accelerator pedal, the transmission gear ratio decreasing to a ratio corresponding to maximum engine power when said throttle valve is fully opened.

6. A method according to claim 1 wherein during said third control phase the transmission gear ratio is decreased in response to accelerator pedal depression beyond an accelerator pedal depression corresponding to a fully opened throttle valve, the depression of said accelerator pedal determining the transmission gear ratio, the transmission gear ratio decreasing to a ratio corresponding to maximum engine power when said accelerator pedal is fully depressed.

7. A method according to claim 6 wherein additional force is required to depress said accelerator pedal beyond an accelerator pedal depression corresponding to a fully opened throttle value.

8. In a vehicle having an engine, an accelerator pedal, a throttle valve and an automatic, continuously variable gear ratio transmission, a method of controlling said throttle valve and said transmission in response to operation of said accelerator pedal following initial acceleration of said vehicle, comprising:

responding to a first lower range of accelerator pedal positions to linearly open and close said throttle valve over a throttle valve angle range up to a selected angle in proportion to accelerator pedal position in said first range and maintaining the maximum gear ratio of said transmission:

responding to a second higher range of accelerator pedal positions to maintain said throttle valve at said selected angle and to linearly decrease the gear ratio of said transmission in proportion to said accelerator pedal position in said second range from said maximum gear ratio to a lower gear ratio corresponding to maximum engine power output;

and responding to a third highest range of accelerator pedal positions to linearly open said throttle valve from said predetermined angle to a fully opened throttle position in proportion to said accelerator pedal position in said third range and maintaining said transmission at said gear ratio corresponding to maximum engine power output.

* * * * *